Aug. 29, 1950 H. C. SMITH 2,520,444
PLASTIC FISHING PLUG
Filed Nov. 5, 1943 2 Sheets—Sheet 1
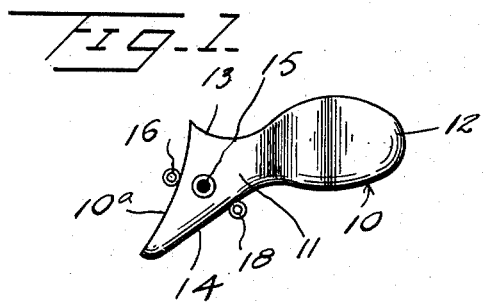
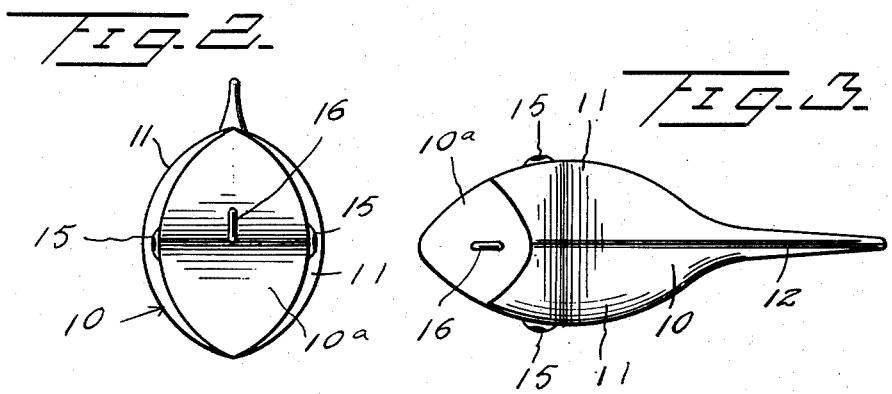
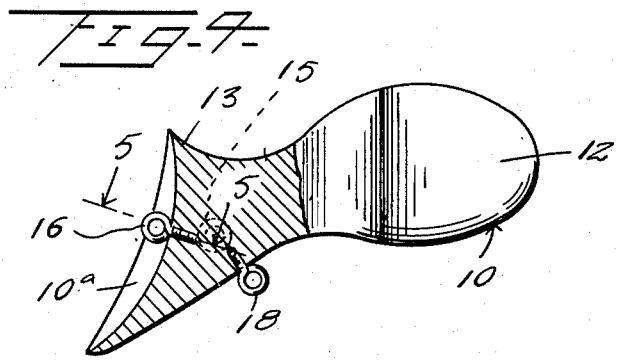
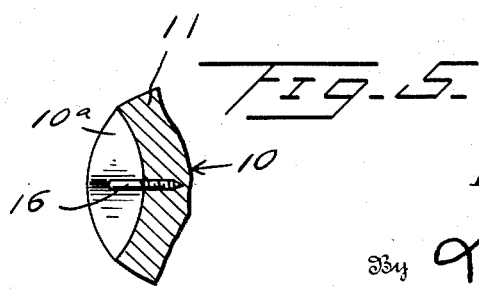
Inventor
H. C. Smith
By L. F. Randolph
Attorney

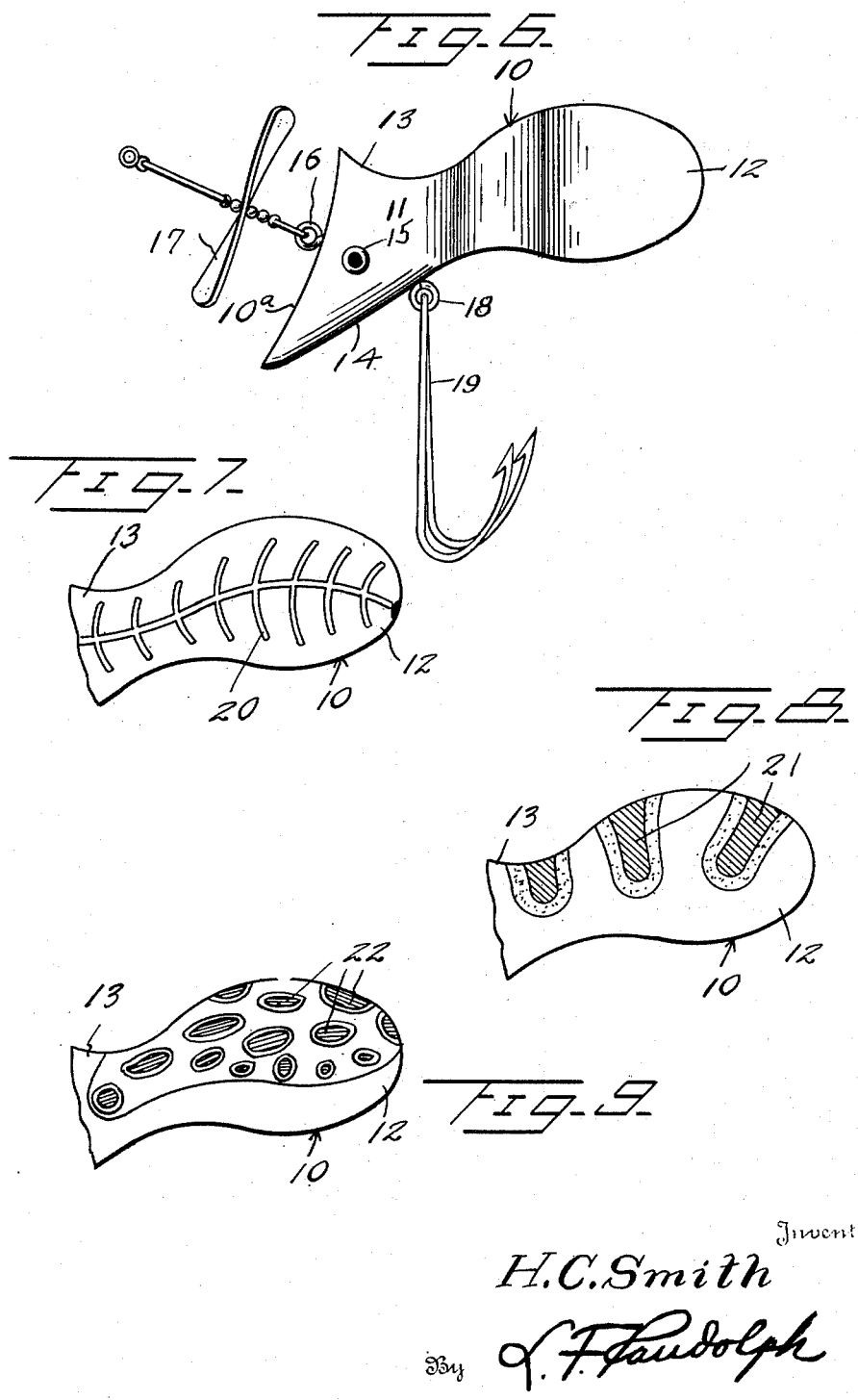

Patented Aug. 29, 1950

2,520,444

UNITED STATES PATENT OFFICE 2,520,444

PLASTIC FISHING PLUG

Henry C. Smith, Fort Wayne, Ind.

Application November 5, 1943, Serial No. 509,107

4 Claims. (Cl. 43—42.41)

This invention relates to a fishing plug having aims to provide a novel construction which may be made from any suitable plastic material and capable for the most part of being molded or cast in a single piece with such accessory elements as may be desired incorporated, such as eyes, eyelets for attachment of the line and hooks, and delineations to represent a backbone, frog, bug or the like.

It is also aimed to provide a construction which may be very rapidly and expeditiously manufactured at minimum cost, which will have eye appeal and which will be durable and well adapted to manufacture in the various sizes for such uses as bass, pike and fly rod fishing.

The more specific objects and advantages will become apparent from a consideration of the description following taken in conection with accompanying drawings illustrating operative embodiments of the invention.

In said drawings:

Figure 1 is a side elevation of the plug;

Figure 2 is a front elevation thereof;

Figure 3 is a top or plan view thereof;

Figure 4 is an enlarged view partly in elevation and partly in section;

Figure 5 is a detail section taken on the plane of line 5—5 of Figure 4;

Figure 6 is an enlarged side elevation showing hooks and a spinner attached and illustrating the normal position of the hooks;

Figure 7 is a fragmentary view of a modified form embodying a representation of a backbone;

Figure 8 is a fragmentary elevation embodying a representation of a frog skin, and Figure 9 is a fragmentary elevation embodying a representation of a bug.

Referring specifically to the drawings wherein like reference characters designate like or similar parts, the plug comprises a body 10 which may be made of any suitable plastic and it may be molded, cast or manufactured in any other desired manner. As best shown in Figure 3, the body 10 from the top or in plan is approximately of the shape of the body of a fish, the same being bulged on opposite sides of the longitudinal central vertical plane as at 11 and decreasing in width toward the tail end to provide a relatively flattened and narrow tail 12.

The body 10, on its upper side and adjacent its forward end, is recessed or of concave formation, as indicated at 13, and the underside of the forward part of the body is inclined forwardly and downwardly and is elongated.

The forward end of the body is wider than the bulged portion 11, as seen in side elevation in Figure 1 and in top plan in Figure 3. Such front end, as shown in Figures 4 and 5, is preferably concaved vertically and horizontally as at 10a.

Attached to opposite sides of the body adjacent the forward end are suitable eye members 15, the same being of any desired construction but preferably bulging with respect to the body.

An eyelet or attaching member is shown at 16, screwed or otherwise fastened in body 10 and projecting from end 10a, intermediate of the top and bottom thereof, and providing means for attachment of the fishing line thereto. However, if desired, between the fishing line and the eyelet 16, a spinner structure as shown at 17 in Figure 6 may be directly connected.

Another eyelet or attaching element similar to that at 16 is employed at 18 and which projects from the under surface 14 midway of the sides of the body, so that hook means 19 may be pivoted or fastened thereto. Surface 14 is inclined downwardly and forwardly so as to extend to substantially below the level of the bottom edge of the tail 12 and eye 18 is located sufficiently above the lowermost part of the forward end of the body so that the hook means 19 will be shielded thereby when the hook means are swung towards the tail 12. The particular hook means 19 shown is a conventional double hook, the hooks of which may swing rearwardly or toward the tail 12. The double hook means 19 may swing on the eye 18 as a pivot from its depending position of Figure 6 upwardly and rearwardly toward the tail 12 in the event that the hook means 19 strikes an obstruction, such as weeds, so that the barbed ends of the hook means will then be shielded by the enlarged forward end of the lure body 10 and be thereby rendered weedless.

The tail 12 is offset upwardly with respect to the forward end of the body 10 to provide a vertical guiding fin. The concave face 10a is relatively long in a vertical direction and extends downwardly and forwardly so that when the lure is drawn through the water said face will cause the lure to dive or be submerged and the location of the eye 16 substantially intermediate of the top and bottom ends of said face 10a will further assist in preventing surfacing of the lure body during trolling or retrieving of the lure.

As shown in Figure 7, the sides of body 10 may have matter thereon or therein at 20 to represent a backbone. In Figure 8, the body may have matter thereon or therein as at 21 on either or both sides thereof to represent a frog skin and in Figure 9, the body may have matter thereon or therein as at 22 to simulate the skin of a bug. It is clear that the matter 20, 21 and 22, may be ordinary painting, may be pigmented or colored matter imbedded in the body or may be provided thereon in any suitable manner.

It is also clear, that the plug is capable of manufacture in any desired size or sizes and ornamented or finished in any suitable way. For instance, the plug may be made in the medium or bass size, also in the fly rod size and in the pike size.

Various changes may be resorted to provided they fall within the spirit and scope of the invention.

I claim as my invention:

1. A fishing lure comprising an elongated body, said body being bulged laterally adjacent its forward end, the lower part of the forward end of the body being elongated and tapered to form a downwardly and forwardly inclined undersurface; the upper surface, at the forward end of the body, being inclined rearwardly, and a tail portion of the body being narrowed laterally behind and adjacent the bulged portion, said tail portion being offset upwardly relatively to the forward part of the body to provide a vertical fin a substantial portion of which is disposed above the level of the upper surface of the forward part of the body.

2. A fishing lure comprising an elongated body, said body being bulged laterally adjacent its forward end, the lower part of the forward end of the body being elongated and tapered to form a downwardly and forwardly inclined under surface; the upper surface, at the forward end of the body, being inclined rearwardly, and a tail portion of the body being narrowed laterally behind and adjacent the bulged portion, said tail portion being offset upwardly relatively to the forward part of the body to provide a vertical fin a substantial portion of which is disposed above the level of the upper surface of the forward part of the body, and said rearwardly inclined upper surface being concave horizontally and vertically.

3. A fishing lure comprising an elongated body, said body being bulged laterally adjacent its forward end, the lower part of the forward end of the body being elongated and tapered to form a downwardly and forwardly inclined under surface; the upper surface, at the forward end of the body, being inclined rearwardly, a tail portion of the body being narrowed laterally behind and adjacent the bulged portion, a fastening member secured in the body and projecting from the downwardly and forwardly inclined under surface at a point substantially above the horizontal plane of the bottom of the tapered forward end, and a fish hook pivotally connected to the fastening member and disposed at least partially behind the forward end of the lure body.

4. A fishing plug comprising a body having a laterally bulged forward portion and a laterally narrowed, upwardly offset tail portion, the lower part of the forward end of the body being elongated and tapered laterally to substantially a point at its lower, forward end; attaching elements projecting from the opposite, front and rear surfaces of the lower portion of said forward end, and a dual barbed hook connected to and extending from the attaching element which projects from said rear surface and having dual shanks terminating in barbed ends normally disposed in a depending position relatively to the body and with the barb hooks thereof extending toward the tail portion, said dual barbed hook being swingable upwardly and rearwardly on the last mentioned attaching element to a shielded position behind the bulged forward portion of the body.

HENRY C. SMITH.

REFERENCES CITED

The following references are of record in the file of this patent:

UNITED STATES PATENTS

| Number | Name | Date |
| --- | --- | --- |
| D. 121,492 | Lucksted | July 16, 1940 |
| 889,505 | Bingenheimer | June 2, 1908 |
| 981,454 | Miller et al. | Jan. 10, 1911 |
| 1,101,223 | Welles | June 23, 1914 |
| 1,272,812 | Keister | July 16, 1918 |
| 1,331,618 | Brown | Feb. 24, 1920 |
| 1,622,063 | Steenstrup | Mar. 22, 1927 |
| 1,848,704 | Farley | Mar. 8, 1932 |
| 2,028,050 | DeWitt | Jan. 14, 1936 |
| 2,184,031 | Wyatt | Dec. 19, 1939 |
| 2,201,082 | Dobbins et al. | May 14, 1940 |
| 2,309,902 | Harvey | Feb. 2, 1943 |
| 2,373,417 | Rosegard | Apr. 10, 1945 |
| 2,402,853 | Sweeney | June 25, 1946 |

FOREIGN PATENTS

| Number | Country | Date |
| --- | --- | --- |
| 329,262 | Great Britain | May 15, 1930 |